United States Patent [19]
King
[11] 3,717,314
[45] Feb. 20, 1973

[54] AIR TURBINE DRIVE SYSTEM FOR TAPE WINDING AND SPLICING MACHINE

[75] Inventor: James L. King, Sudbury, Mass.
[73] Assignee: King Instrument Corporation, Waltham, Mass.

[22] Filed: June 21, 1971
[21] Appl. No.: 154,857

[52] U.S. Cl. .................242/75.53, 242/45, 242/56 R
[51] Int. Cl. .............................................B65h 59/00
[58] Field of Search...........242/75.53, 45, 75.5, 75.3, 242/56; 60/102, 53 C

[56] References Cited

UNITED STATES PATENTS 1,832,430 11/1931 Siebs ............................242/75.51 X
2,200,811 5/1940 Thompson.........................242/75.53
2,469,004 5/1949 Rosebrough .......................242/75.53
3,363,709 1/1968 Hukerikar.........................60/102 UX

*Primary Examiner*—Stanley N. Gilreath
*Assistant Examiner*—Milton S. Gerstein
*Attorney*—Robert J. Schiller et al.

[57] ABSTRACT

A drive system for transporting tape that is capable of rapidly accelerating to a high speed and of maintaining tension on the tape as it is being transported. The drive system utilizes two air turbines, one of relatively large inertia for driving a supply spool of tape and the other of relatively small inertia for driving a winding spindle, and includes valve means for adjustably and independently controlling the air input to each turbine.

15 Claims, 5 Drawing Figures

INVENTOR.
JAMES L. KING

BY
Schiller & Pandiscio
ATTORNEYS

INVENTOR.
JAMES L. KING
BY
Schiller & Pandiscio
ATTORNEYS

INVENTOR.
JAMES L. KING
BY
Schiller & Pandiscio
ATTORNEYS

AIR TURBINE DRIVE SYSTEM FOR TAPE WINDING AND SPLICING MACHINE

This invention relates to winding machines and more particularly to machines for splicing and winding tapes into cassettes.

The primary object of this invention is to provide a new and improved apparatus for winding magnetic tape or other types of narrow light-weighted webs.

A more specific object of this invention is to provide a new tape drive system for use in machines for splicing and winding tapes into cassettes.

A further specific object of the invention is to provide a new and improved air turbine tape drive system for magnetic tape winding and splicing machines, the system being fast acting, easy to construct and maintain, and capable of manufacture at relatively low cost.

Still another object of the present invention is to provide a tape drive system for use in machines for splicing and winding magnetic or other types of tapes into cassettes that is capable of feeding a predetermined amount of tape.

Magnetic tape cassettes, e.g., of the type shown in U.S. Pat. Nos. 3,423,038 and 3,167,267, are customarily available commercially with blank (i.e., unrecorded) tape or with prerecorded tape. Usually the cassette consists of a cassette case containing two rotatable spools or hubs, a leader attached to each spool or hub, and a predetermined length of magnetic tape having its end spliced to the two leaders. In the manufacture of such cassettes, the common practice is to start with an empty cassette consisting of the cassette case with the two hubs and a single length of leader tape having one end connected to one hub and the other end connected to the second hub. The first step in filling the cassette with blank or pre-recorded tape is to cut the leader tape to form two discrete leaders. Then the magnetic tape to be wound into the cassette is spliced to one leader and the hub to which the one leader is connected is rotated to wind up a given length of magnetic tape. Thereafter the magnetic tape is cut and the trailing end of the given length of magnetic tape is spliced to the leader attached to the other hub. An alternative procedure is to start with only the two hubs each having a short leader, splice magnetic tape to the leader on one hub, wind a given amount of tape on that one hub, splice the trailing end of the tape to the leader on the other hub, and thereafter mount the two hubs in a cassette case. Pre-recorded tape is generally supplied on a large reel with the tape containing a series of identical recordings, e.g., a series of so-called "albums" of music, with a low frequency Q signal recorded between each album so as to indicate the end of one album and the beginning of another album. In loading cassettes with pre-recorded tape, it is essential to provide for sensing the Q signal and means operative when a Q signal is sensed to stop the tape and sever it between albums. Accordingly, a further object of the invention is to provide a tape drive mechanism for use in a machine for loading cassettes with blank or pre-recorded tape according to the foregoing manufacturing procedures.

For efficiency of manufacture in winding magnetic tape into a cassette from a large supply reel, it is essential for the tape transport means to come up to speed rapidly, maintain a limited tension on the tape as it is being transported, and rapidly come to a stop when a predetermined amount of tape has been transported. Since a fast-moving tape cannot be stopped instantaneously when a Q signal is sensed, it is also essential to provide a tape transport means that is capable of reversely transporting the tape at a slow speed after a Q signal is sensed so as to enable the machine to slice the tape in the region where the Q signal is recorded. Accordingly, still other objects of the invention are to provide a tape transport means capable of meeting the foregoing requirements for winding and splicing prerecorded magnetic tape.

The foregoing and other objects which are rendered obvious to persons skilled in the art from the following specification are achieved by a tape transport mechanism comprising a first relatively large air-driven turbine for driving a spindle supporting a supply reel of magnetic tape, a second relatively small air-driven turbine for driving a winding spindle that is connected to a hub on which the tape is to be wound, and means for establishing relative rates of flow of air to the two turbines such that the tape is transported and wound under tension, with the tension not exceeding about three ounces. Brake means are provided for rapidly stopping the turbines when a desired amount of tape has been unwound from the supply reel. For unrecorded tape, a counting means is provided for measuring the amount of tape being transported and for causing the tape transport means to be halted when the desired amount of tape has been unwound from the supply reel. For pre-recorded tape, means including a magnetic reading head are provided for sensing the Q signal and for stopping the turbines when a Q signal is detected. Additional means are provided for automatically reversing the supply reel turbine after a Q signal has been detected so as to move that portion of the tape having the recorded Q signal back to a splicing station where the tape is severed by a tape cutter.

Other features and many of the attendant advantages of the invention are set forth in or rendered obvious by the following detailed specification which is to be considered together with the accompanying drawings wherein.

Figure 1:
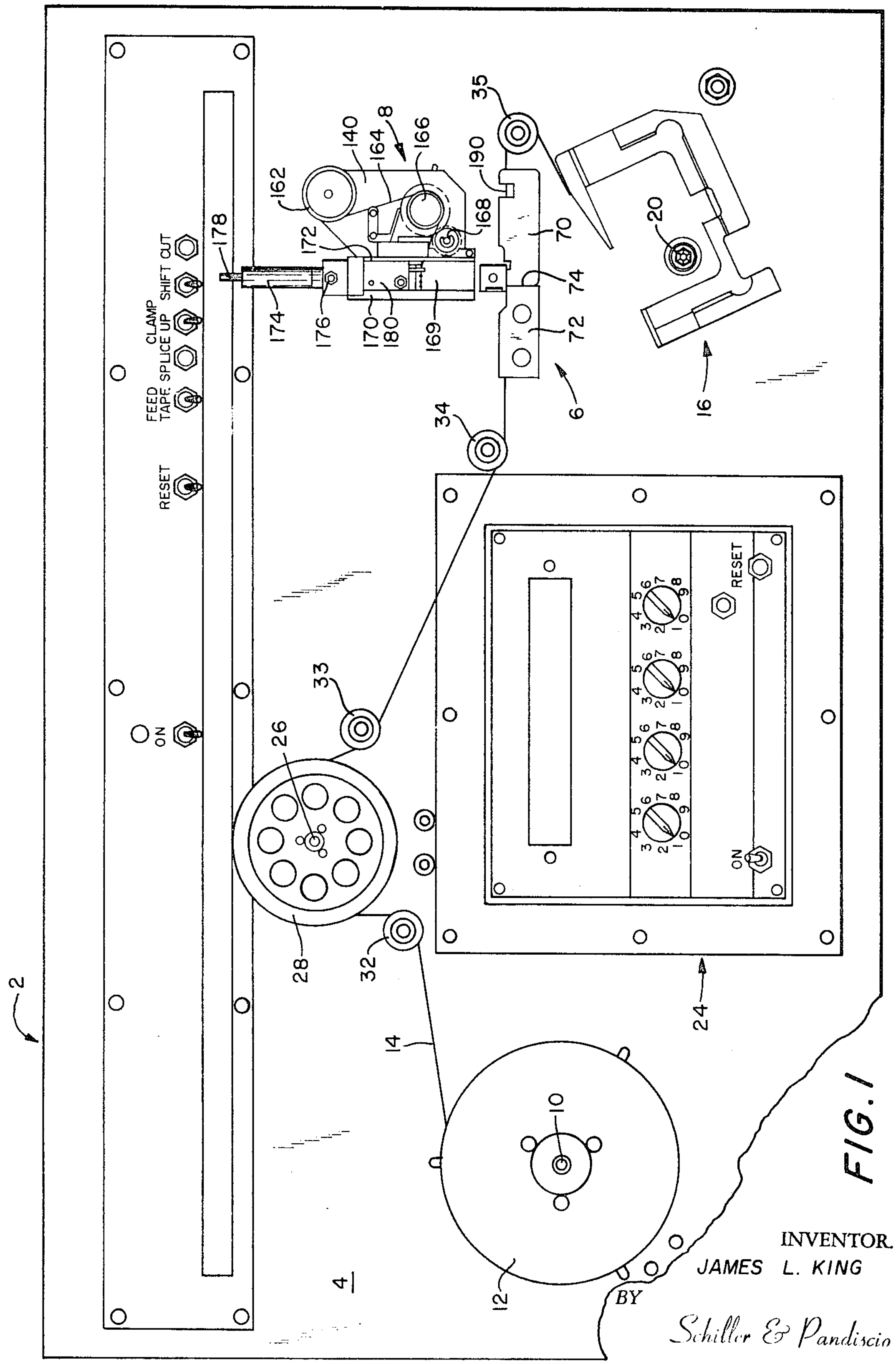
FIG. 1 is a front elevation of a cassette tape winding and splicing machine embodying a tape transport mechanism constructed in accordance with this invention.
Figure 2:
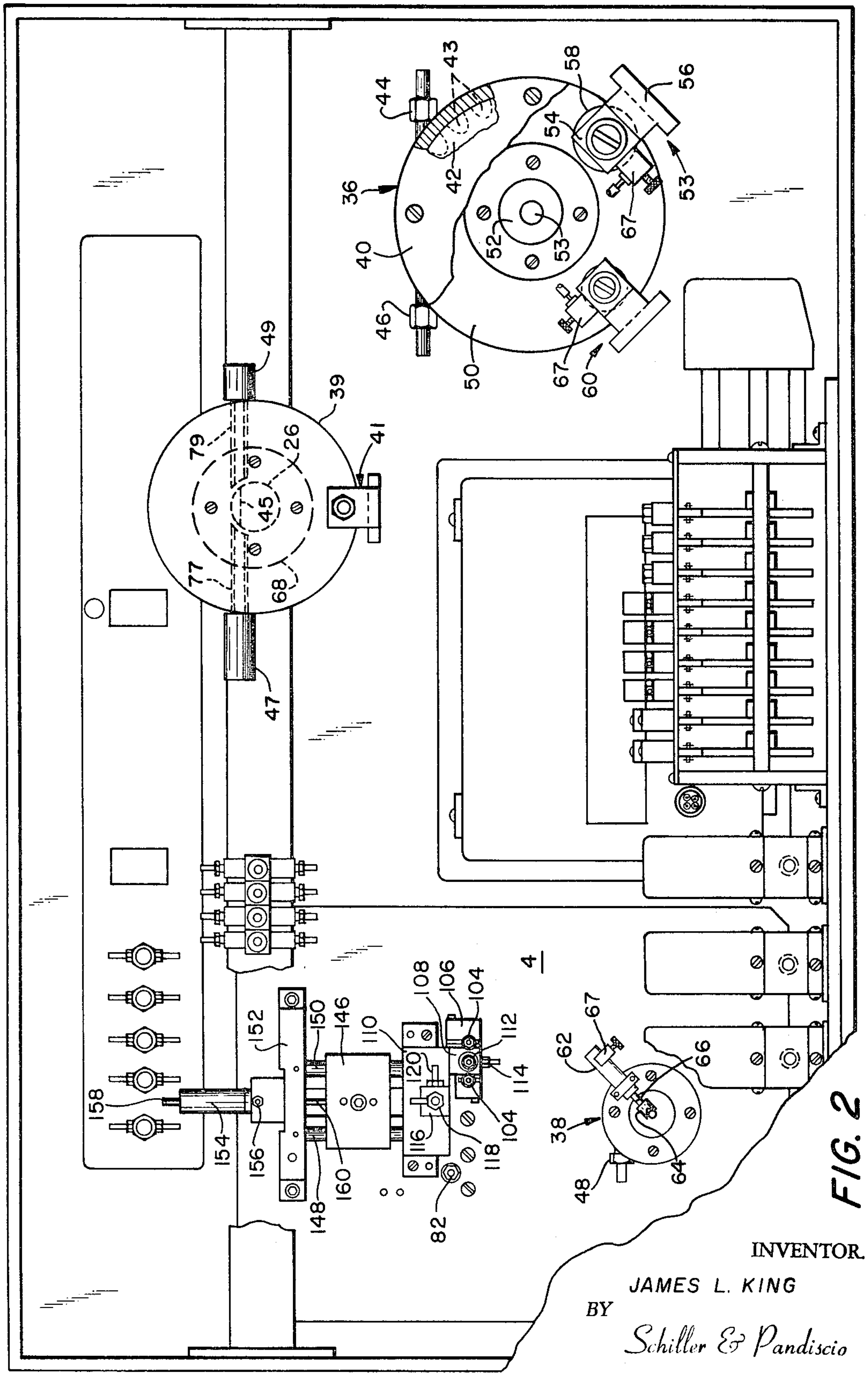
FIG. 2 is a rear view of the winding machine of FIG. 1 with certain elements omitted for convenience of illustration.

Turning now to FIGS. 1 and 2, the illustrated cassette tape splicing and winding machine comprises a console 2 having a front panel 4 which supports a splicing head assembly 6, a splicing tape dispensing mechanism 8, a rotatable shaft 10 which projects through front panel 4 and supports a reel 12 on which is wound a supply of magnetic tape 14 that is to be used in filling cassettes, and a cassette holder 16 adapted to hold a cassette 18

Figures 3, 4:
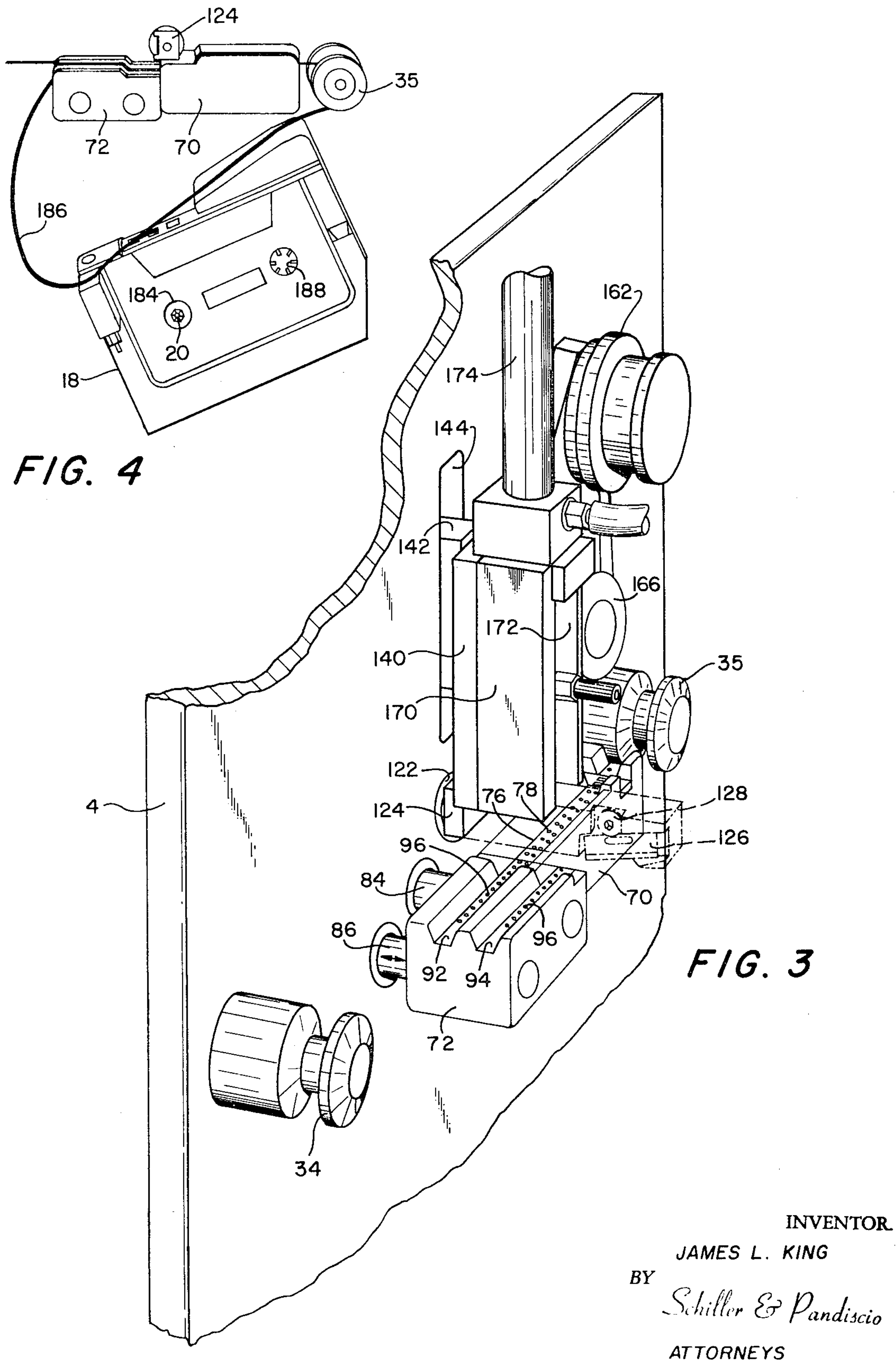
FIG. 3 is a perspective view of the splicing head assembly and a splicing tape dispensing mechanism associated with the splicing head assembly.
FIG. 4 is a perspective view of a cassette with its leader extended over the splicing head.

(see FIG. 4). The machine also includes a rotatable winding spindle 20 that projects out of front panel 4. Spindle 20 is adapted to mate with and drive one of the hubs of a cassette mounted in the holder 16. Also mounted on panel 4 is a conventional electronic counter 24 of the type that counts input pulses and is adapted to reset itself and also produce an output pulse when the number of input pulses reaches a preselected total. By way of example, the counter may be a Series 7112 Econoflex Counter made by Veeder-Root Instrument and Electronics Division, 70 Sargeant Street, Hartford, Connecticut 06102, that is capable of operating at 2000 counts per second and recycling automatically when a preset count is reached.

The machine also includes a rotatable shaft 26 that projects through front panel 4 and has secured thereto a large footage counting wheel 28. Tape 14 is paid out from reel 12 under a guide roller 32, up around the footage counting wheel 28 and then under two additional guide rollers 33 and 34 to the splicing head assembly 6. A fourth guide roller 35 is provided for guiding tape extending from the splicing head assembly to a cassette (not shown) mounted in holder 16. The four guide rollers are rotatably mounted on like stub shafts mounted to panel 4.

The supply reel shaft 10 and the winding spindle 20 are connected to and driven by two air turbines 36 and 38 (see FIG. 2) which are affixed to the rear side of front panel 4. The turbine 36 comprises a hollow housing 40 in which is mounted a rotor 42 that is coupled to shaft 8. Rotor 42 has a plurality of cavities 43 in its periphery. Housing 40 has two air inlets 44 and 46 which are connected by hoses to appropriate air supplies and air valving mechanisms hereinafter described. Air supplied via inlet 44 acts on cavities 43 to cause the rotor 42 to rotate counterclockwise (as seen in FIG. 2) so as to cause the reel 10 to pay off tape for delivery to the splicing head. Air supplied via inlet 46 of the tape supply turbine 36 acts on cavities 43 to cause the rotor to rotate in a clockwise direction (as seen in FIG. 2) whereby to cause the reel 10 to rotate in a direction to pull tape away from the splicing head assembly 6. The other turbine 38 is of similar construction but has only a single inlet 48 which admits air to rotate spindle 20 counterclockwise as seen in FIG. 1. Inlet 48 is connected to an air supply and to an appropriate air valving mechanism described hereinafter. It is to be noted that the turbine 38 is substantially smaller than the turbine 36, with the result that its housing has a smaller air capacity and its rotor has a relatively low inertia as compared to the housing and rotor of turbine 36.

Each of the turbines is also provided with braking means for stopping rotation of the shaft 10 and spindle 20 and for holding the supply reel stationary during a splicing operation. The brake means for turbine 36 comprises a brake disc 50 attached to a hub 52 mounted on the rear end of the rotor shaft 53. Cooperating with brake disc 50 is a brake mechanism 53 consisting of a conventional fluid actuator 54 attached to a bracket 56 that is mounted to the rear side of front panel 4. The fluid actuator has a brake pad 58 attached to the end of its operating piston rod. When the actuator is applied with air so as to cause its piston rod to be extended, the brake pad is caused to engage disc 50 and thus force the rotor of turbine 36 to come to a stop. When the fluid actuator is supplied with air so as to retract its piston rod, the brake pad 58 is disengaged from the brake disc so that the turbine rotor is free to rotate under the influence of air supplied via one of the inlet ports 44 and 46. A second brake mechanism 60 similar to mechanism 53 may be associated with the brake disc 50. This second brake mechanism may be used to hold the supply reel against movement during a splicing operation as hereinafter described, in which case, brake mechanism 53 is used only to stop rotation and is released after the supply reel has stopped. Alternatively, brake mechanism 60 may be omitted and the brake mechanism 53 may be used to stop rotation of the turbine 36 and also to hold the supply reel steady during a splicing operation. The second smaller turbine 38 has a braking mechanism which consists of a fluid actuator 62 having a block 64 attached to its piston rod 66. The fluid actuator 62 is attached to the panel 4. The block 64 has a V-shaped end slot which is sized so as to embrace the rear end of spindle 20 which also supports the rotor and projects out of the rear end of the housing of turbine 38. When fluid actuator 62 is supplied with air so as to extend its piston rod, the block 64 engages the spindle 20 and causes it and the rotor of turbine 38 to come to a stop. Retraction of the piston rod frees the spindle for rotation under the influence of air supplied to the turbine via inlet 48. The actuator 62 and the corresponding actuator 54 of brake mechanisms 53 and 60 have small needle valves 67 attached to one of their inlet ports (the ports through which air is admitted to cause piston rod extension). The needle valves permit adjustment of the rate of flow of air to the brake actuators so as to control the speed with which the actuators respond to input air and the resulting braking force.

Attached to the rear end of counting wheel shaft 26 is a hub 68 (FIG. 2) having a large brake disc 39 attached to its rear end. Associated with the brake disc and attached to the rear side of panel 4 is a brake mechanism 41 similar to brake mechanisms 53 and 60. The rear end of shaft 26 is provided with a flat bottomed slot 45 that extends transversely of the shaft and has a depth less than the shaft's radius. Also attached to the rear side of the panel 4 are a light source 47 and a photocell detector 49. Mounted in line with the light source and the photocell are two hollow tubes 77 and 79 which are positioned so as to confine the beam of light from light source 47 to a size corresponding to the depth of the slot 45 and also to further channel the beam so that it is aligned with the slot and impinges on the photocell when shaft 26 is in the position shown in FIG. 2. Accordingly, when shaft 26 is rotated, slot 45 moves out of alignment with the two light conducting tubes, causing the light beam to be intercepted by a solid portion of the shaft and thereby prevented from impinging on the photocell. When shaft 26 is rotating, light will impinge upon the photocell once for each revolution of the shaft, and the photocell will produce an output signal pulse each time it sees light. This output signal serves as an input pulse to the counter. The braking means 39 and 41 are operated to stop rotation of shaft 26 at the same time as the turbines are brought to a stop by their own braking means.

The splicing head assembly 6 forms no part of the present invention and is illustrated and described hereinafter only to the extent necessary to explain the operation of the machine; also other splicing head assemblies may be used in its place.

Turning now to FIGS. 1 and 3, the splicing head assembly 6 is essentially the same as the splicing head described and illustrated in my co-pending U.S. Pat. application, Ser. No. 147,376 for APPARATUS FOR SPLICING TAPE, executed May 25, 1971 and filed May 27, 1971. The splicing head assembly 6 comprises a stationary splicing block 70 affixed to panel 4 and a moveable splicing block 72. The two blocks have mutually confronting flat vertical end surfaces identified by numeral 74 that are separated by a very narrow gap. The stationary block 70 has a horizontally extending upper surface in which is formed a single groove 76 which functions as a guideway for tape 14. The base of the groove is flat and its sides are slanted, and its width is only slightly greater than the width of tape 14 so that the tape is restrained against shifting laterally when it is stationary or when it is being transported. The base of groove 76 is provided with a series of small apertures 78.

The apertures 78 communicate with an interior passageway (not shown) in block 70 which has a port on the rear side of block 70 in which is mounted a hose fitting 82 (FIG. 2). A hose (not shown) is connected to the fitting and extends to a source of vacuum through a suitable valve means. Thus if tape is placed in groove 76 and vacuum is applied to the stationary splicing block via the fitting 82, a suction force will be established which will hold the tape tight against the bottom of the groove.

The moveable splicing block 72 is mounted on two parallel slide rods 84 and 86 (FIG. 3) which are slidably disposed in front panel 4. The block 72 has a horizontally extending upper surface that is formed with two grooves 92 and 94 which extend parallel to each other and to the corresponding groove 76 in the fixed splicing block 70. The grooves 92 and 94 have the same shape as the corresponding groove 76. Splicing block 72 also has a series of apertures 96 formed in the base of each of the grooves 92 and 94 whereby suction may be applied to tapes positioned in the two grooves. The moveable block 72 is provided with two interior passageways (not shown) that communicate with the apertures 96 of grooves 92 and 94 respectively, and these passageways have inlet ports that communicate with longitudinally extending bores (not shown) formed in the slide rods 84 and 86. The apertures 96 of groove 92 communicate with the axial bore in slide rod 84 while the corresponding apertures 96 of groove 94 communicate with the axial bore in slide rod 86. The slide rods 84 and 86 have hose fittings 104 mounted in the rear ends thereof which communicate with their axial bores. Hoses (not shown) are connected to fittings 104 and extend to a source of vacuum through separate control valves.

The grooves 92 and 94 of the moveable splicing block 72 are co-planar with the single groove 76 in the fixed block 70, so that by moving block 72 in and out relative to panel 4 it is possible to align either of the grooves 92 and 94 with groove 76. As shown in FIG. 3, block 72 has been moved away from panel 4 to a position in which its groove 92 is aligned with groove 76.

The rear ends of the two slide rods 84 and 86 are attached to a moveable cross block 106 disposed behind the panel 4. Also disposed behind the panel 4 is a fluid actuator 108 which is secured to a large block 110 that is affixed to panel 4. Actuator 108 is of the double-acting type and, although not shown, it is to be understood that its piston rod is connected to the moveable cross block 106. The two inlets of actuator 108 are provided with hose fittings 112 and 114 which are connected by means of hoses (not shown) and an appropriate control valve mechanism to a source of pressurized air. Thus if air is applied to actuator 108 via its fitting 112, its piston rod will be extended and will move the splicing block 72 outwardly far enough to place its groove 92 into alignment with groove 76 of splicing block 70. When air is applied to actuator 108 through its other fitting 114, the actuator's piston rod is retracted, moving the splicing block 72 up against the panel 4 so as to place its groove 94 into alignment with groove 76 of block 70.

Also forming part of the splicing head assembly is a knife mechanism which comprises an actuator 116 which is affixed to the block 110 described above. Actuator 116 is a double-acting unit, having hose fittings 118 and 120 at opposite ends of its cylinder. The piston rod of actuator 116 extends through an oversized hole in the block 110 and attached to its free end is an elongate cutter blade support arm 124. The support arm 124 extends through a bushing 122 disposed in an aperture in the panel 4. The free end of support arm 124 is slotted on one side so as to accommodate a cutter blade 126 which is secured thereto by a screw 128. The cutter blade is mounted with its cutting edge facing down and in line with the small gap between the two splicing heads 70 and 72. The cutter blade 126 also is mounted so that its cutting edge is inclined as shown in FIG. 3. When the piston rod of actuator 116 is fully retracted, arm 124 is withdrawn far enough (as shown in FIG. 3) so that the cutter blade 126 will not interfere with movement of tape along the groove 76. When the piston rod of actuator 116 is extended, the cutting edge of cutter blade 126 moves forward and slices through whatever tape is extending across from the groove 76 to one of the grooves 92 and 94.

The splicing tape dispensing unit 8 is adapted to apply a piece of splicing tape to the abutting ends of tapes supported by the two splicing blocks. As indicated previously, the splicing tape dispensing unit forms no part of the present invention and may be replaced by other equivalent mechanisms capable of performing the same function of applying splicing tape. Described briefly, the splicing tape dispensing unit comprises a carriage plate 140 (FIGS. 1 and 3) that is attached to an arm 142 that extends through a slot 144 in panel 4 and forms part of a slide block 146 located on the rear side of panel 4. Slide block 146 is slidably mounted on two vertical slide rods 148 and 150 whose opposite ends are secured in block 110 mentioned previously and a second block 152. Block 152 is affixed to the rear side of panel 4. Block 152 supports a double-acting fluid actuator 154 having hose fittings 156 and 158 at the opposite ends of its cylinder. Hoses (not shown) connect the hose fittings 156 and 158 to a suitable supply of pressurized air through suitable valving mechanism. The actuator 154 has a piston rod 160 that extends through a hole in block 152 and is secured to the slide block 146. Thus by suitable application of air to actuator 154, the slide block 146 can be made to reciprocate up and down on slide rods 148 and 150. The carriage plate 140 is adapted to rotatably support a supply roll 162 of splicing tape 164 of the type having a pressure sensitive adhesive coating on one side. The carriage plate 140 also carries a feed roll 166 and a feed roll 168 that are mounted on suitable shafts rotatably mounted to plate 140. Tape 164 passes around roll 166 and between that roll and roll 168. The tape dispensing unit also includes a plurality of means (not shown) which cause rolls 166 and 168 to rotate clockwise and counterclockwise respectively (as seen in FIG. 1) when the carriage plate 140 is moved upwardly and which prevent rotation of the same rolls when the carriage plate moves downwardly. When the carriage plate moves upwardly, the resulting rotation of rolls 166 and 168 causes a predetermined amount of splicing tape to be pulled off from supply roll 162. The leading end of the splicing tape passes into and extends across a vertical channel 169 defined by two spaced vertically extending plates 170 and 172 that are attached to carriage plate 140. Plate 172 has a horizontal slit (not shown) for admitting the splicing tape to the guide channel 169. Attached to and supported by the upper ends of plates 170 and 172 is another fluid pressure actuator 174 of the double-acting type. Actuator 174 has hose fittings 176 and 178 at the opposite ends of its operating cylinder. Attached to the end of the piston rod of actuator 174 is a plunger 180 that is mounted between and guided by the two plates 170 and 172. The plunger 180 carries a cutter blade (not shown) that slides along the inner face of plate 172 and is adapted to sever the tape 164 by a shearing action, thereby providing a short section of splicing tape in the path of plunger 180. The tape severing action occurs when the plunger 180 is driven downward in the guide channel 169. The severed section of splicing tape, being in the path of plunger 180, is driven by the plunger down on to the two splicing blocks 70 and 72 in line with the groove 76. When the carriage plate 140 moves up again, splicing tape is advanced into the guide channel 169 by rolls 166 and 168 so that another section of splicing tape may be cut and applied on the next downward stroke of the carriage plate.

Figure 5:
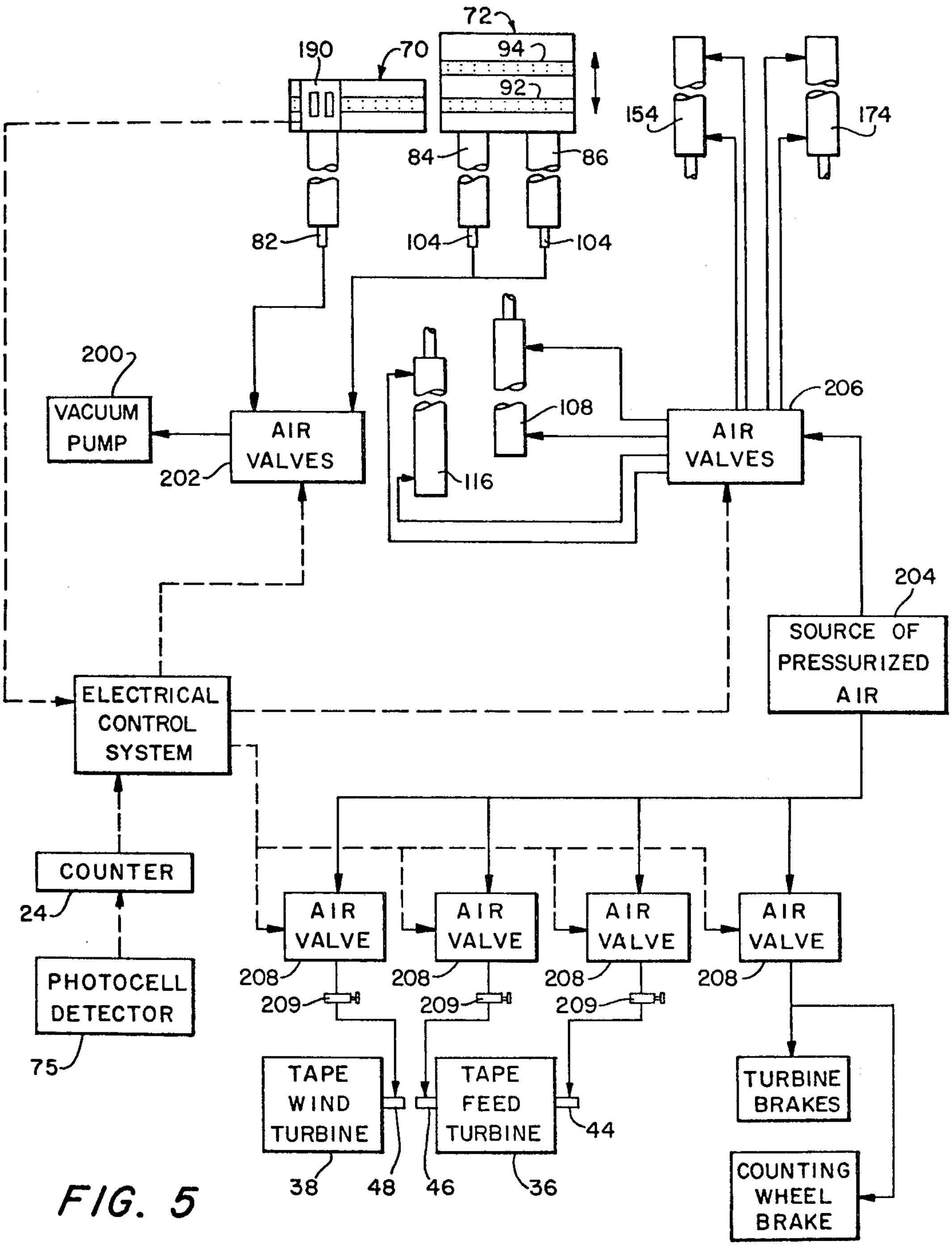
FIG. 5 is a schematic diagram of the control system of the machine showing other relevant portions of the machine.

Referring now to FIG. 5, the manner in which the turbine drive system is operated in the machine described above so as to load a tape cassette with blank magnetic tape will now be described. Initially magnetic tape 14 is unwound from reel 10 and passed over the counting wheel 24 as shown in FIG. 1 far enough to be positioned on the guideway 92 of movable splicing block 72, with the leading end of the tape located just short of the gap between blocks 70 and 72. At this time, vacuum is being applied through the axial bores in both slide rods 84 and 86 so that the tape will be held in groove 92 by suction. Suction is also applied through fitting 82 to splicing block 70. Then a preleadered cassette 18 (see FIG. 4) is mounted in holder 16 so that its left-hand hub 184 is locked to the spindle 20. It is to be noted that a pre-leadered cassette is one having a length of leader tape 186 attached to its two hubs. Sufficient leader tape is provided in the cassette 18 to permit the leader tape to be pulled out far enough to be placed over the two splicing blocks. As seen in FIG. 4, the leader tape 186 is pulled out to form a large loop which is reversed so that the leader extends from hub 184 upwardly around the guide roll 35, then along the grooves 76 and 94 of splicing blocks 70 and 72, and then back to the second hub 188 of the cassette. The leader tape is held in place in grooves 76 and 94 by suction. Initially splicing block 72 is retracted so that groove 94 is aligned with the groove 76, whereby the loop of leader 186 can be disposed in these two grooves 94 and 76 as above described. Thereafter the cutter mechanism is actuated to cause the cutter arm 124 to move out over the two splicing blocks whereby its cutting blade 126 severs the leader tape 186 into two discrete leaders, one supported on splicing block 70 and connected to hub 184, and the other supported on splicing block 72 and connected to hub 188. As soon as the cutter arm 124 has returned to its original retracted position, the actuator 108 is caused to shift the splicing block 72 away from the panel 4 to the position shown in FIG. 3 so that the magnetic tape 14 resting in groove 92 is now aligned with the leader supported by splicing block 70. Thereafter the tape dispensing unit 8 is operated. It is to be noted that the unit 8 is normally in the elevated position shown in FIGS. 1 and 3. When it is operated, its carriage plate 140 moves downward far enough for the bottom ends of the plates 170 and 172 to be close to or lightly contact the tapes resting in grooves 76 and 92. At that point the actuator 174 is caused to move the plunger 180 downward. Assuming that splicing tape 164 has previously been fed through plate 172 across the channel 169 as far as plate 170, downward movement of plunger 180 will sever the splicing tape adjacent to plate 172, and the severed section of splicing tape is then driven downward by plunger 180 onto the adjacent ends of the magnetic tape and the leader supported by splicing blocks 70 and 72. Plunger 180 is immediately retracted, and as this occurs, the carriage plate 140 is also retracted to its original raised position. Once the tape 14 has been spliced to the leader supported by splicing block 70, the turbines 36 and 38 are actuated to drive shaft 10 and winding spindle 20 in a direction to wind tape onto the hub 184 of the cassette. At this point, it is to be noted that during the time that the driving spindle 20 is being rotated, vacuum is being constantly applied to the apertures 96 of the groove 94 so as to hold in place the leader that is attached to the hub 188. Vacuum may continue to be applied to the grooves 76 and 92 as the tape is being wound since any suction effect will not prevent the tape from being pulled by rotation of spindle 20. Preferably, however, vacuum is turned off with respect to those two grooves during the winding operation. Once a predetermined amount of tape has been wound on hub 184 (as measured by the number of input pulses to counter 24), shaft 10 and spindle 20 are stopped and vacuum is reapplied so as to hold the tape 14 by suction in the grooves 76 and 92. Thereafter the cutter mechanism is again actuated so as to cause cutter blade 126 to sever the tape 14 along the line of separation between the two splicing blocks. Then the actuator 108 is caused to return the splicing block 72 to its original position in which its groove 94 is aligned with the groove 76. Once this has occurred, the splicing tape dispensing unit 8 is again actuated so as to apply a section of splicing tape to the trailing end of the tape 14 resting in the groove 76 and the end of the leader 186 located in the groove 94. Thereafter the leader and the tape 14 attached thereto are lifted off the two splicing blocks and the guide roll 32 and the cassette removed from the holder 16. One of the hubs 184 and 188 is then rotated so as to draw all of the tape into the cassette. A new cassette is then installed in the holder 16 with its leader pulled out and placed into the grooves 94 and 76 of the two splicing blocks, and then the cutting, splicing, and winding operations above described are repeated.

As noted above, it is common practice in the manufacture of cassettes to load the cassettes with tape carrying a series of identical recordings, e.g. a series of so-called "albums" of music with a Q signal recorded between each album. For processing pre-recorded tape, it is preferred to provide means for sensing the Q signal. Such means takes the form of a magnetic read head 190 (FIGS. 1 and 5) which is mounted in a cavity in the splicing block 70. The read head 190 is disposed with its upper surface flush with the bottom of groove 76 so as to be lightly engaged by tape 14 as the tape is being transported to the cassette. When the magnetic read head 190 senses a Q signal, associated electronic means (not shown) coupled to the read head produces an output signal which is used to sequentially (1) operate the valving mechanism which controls the supply of air to the two turbines and also the brake mechanism associated with such turbines so as to stop shaft 10 and spindle 20, (2) release the turbine brakes and apply air to turbine 36 via "reverse" inlet 46 to slowly draw magnetic tape from the cassette until the Q signal is again detected, (3) stop turbine 36, (4) cut tape 14 at the location of its Q signal, (5) retract splicing head 72, and (6) then splice the leader in groove 94 to the trailing end of the tape previously wound on cassette hub 184. The reverse movement of turbine 36 is at a fraction of its forward speed and is required since it is impossible when winding tape into the cassette to stop the tape exactly where the Q signal is detected. Hence the tape is backed up slowly to locate the Q signal in the region of the cutter blade 126. When winding pre-recorded tape, the counter 24 is shut off.

FIG. 5 schematically illustrates the control system for a winding machine employing the invention. In FIG. 5, the full lines represent air lines and the broken lines denote electrical connections. Suction for holding tapes on the splicing blocks 70 and 72 is achieved by means of a suction pump 200 which is connected to hose fittings 82 and 104 via three air valves represented schematically at 202. Air for operating actuators 108, 116, 154, and 174 is applied from a pressure source 204 via a plurality of air valves 206. An additional plurality of air valves 208 connect the source of pressurized air to the inlets 44 and 46 of turbine 36, inlet 48 of turbine 38 and the turbine and counting wheel brake actuators. Valves 202, 206 and 208 preferably are solenoid operated on-off valves. Manually controllable needle valves 209 permit the air inputs to turbines 36 and 38 to be independently controlled. Operation of air valves 202, 206 and 208 so as to effect the sequential operation described above is effected by an electromechanical control system represented schematically at 210 which is adapted to operate in response to the signal output of counter 24 or read head 190. It is to be noted that the control system and the actuating elements controlled thereby may take various forms obvious to persons skilled in the art. Thus the air actuators may be replaced by hydraulic actuators or solenoid type actuators, while valves 202, 206 and 208 may be operated by cams or other suitable means.

Turbine tape drives constructed as herein described offer a number of advantages, including the obvious ones of simplicity of construction, reliability, low cost, and ease of maintenance. The most notable advantages are with respect to winding speed, and tension control. The invention recognizes and takes advantage of the fact that the torque load of reel 12 with its relatively large supply of magnetic tape is substantially greater than the torque load of a cassette hub or spool even in the case where a substantial amount of tape has been wound on the cassette hub, and also that the angular speed at which reel 12 has to be rotated when carrying a fully load of tape is substantially less than the angular speed at which the cassette hub has to be driven by spindle 20 in order to maintain an even tension on the tape as it is being wound. In this connection it is to be noted that a customary requirement of the magnetic tape cassette industry is for magnetic tape to be wound under a tension not exceeding about three ounces. A further requirement of the industry is to wind and splice at the fastest possible speed so as to minimize the overall cost of loading cassettes with tape. Accordingly it is desirable for the tape drive system to be capable of high rates of acceleration and deceleration. Compliance with the foregoing operational requirements is easily achieved with the present invention. For one thing, a turbine drive system as above described permits loading a cassette with a given amount of tape in at least 30 percent less winding time than is possible with conventional electric motor type drive systems designed for the same purpose. This is due to the fact that the two air turbines can be driven at high speeds and can be brought up to maximum speed and stopped within relatively short intervals. For another thing, it permits tape to be wound on a cassette hub at an average tension of less than one ounce. Characteristically, maximum tape tension occurs when starting up the turbines, but this maximum tension is of relatively short duration and is easily kept to within three ounces. This close tension control is made possible by (a) the fact that the smaller turbine 38 has less rotor inertia and thus can accelerate faster than the larger turbine 36, and (b) the individual control of turbine speed made possible by needle valves 209. Preferably the takeup turbine 38 has a rotor with less than half the mass and inertia of supply reel turbine 36; preferably, but not necessarily, air is supplied to both turbines at the same pressure. Needle valves 209 are set to provide air flow to the two turbines at rates such that turbine 38 wants to wind tape at a slightly faster rate than it is paid off of the supply reel by turbine 36, so that tension is maintained. Since the total volume of air required to be supplied to turbine 38 per unit time from source 204 is substantially less than what is required to be supplied to turbine 36, relatively fine adjustments in tension are possibly by independently adjusting the needle valves associated with the two turbines. Assuming that the source of pressurized air 204 is regulated so that air is supplied to valves 208 at a substantially constant pressure, once the needle valves 209 have been set to maintain an even tape tension, the machine may be operated repetitively with consistent results without need to reset the needle valves. The reverse speed of turbine 36 is adjustable by varying the needle valve 209 in the line that feeds air to the turbine inlet 46.

What is claimed is:

1. In apparatus for unwinding tape from a first spool onto a second spool, the improvement comprising:
   - a first turbine having a rotor adapted to be driven by a fluid;
   - a first shaft coupled to the rotor of said first turbine so as to rotate therewith, said first shaft being adapted to support a first spool carrying a supply of tape;
   - a second turbine having a rotor adapted to be driven by a fluid, the rotor of said second turbine having substantially less mass and a substantially smaller amount of inertia than the rotor of said first turbine;
   - a second shaft coupled to the rotor of said second turbine so as to rotate therewith, said second shaft being adapted to support a second spool on which tape from said first spool is to be wound;
   - first means for applying fluid under pressure to said first turbine to drive the rotor thereof in a predetermined direction, said first fluid-applying means including a first valve for adjustably controlling the rate of flow of fluid to said first turbine;
   - second means for applying fluid under pressure to said second turbine to drive the rotor thereof in a predetermined direction, said second fluid-applying means including a second valve for adjustably controlling the rate of flow of fluid to said second turbine;
   - a source of fluid under pressure;
   - and control means connecting said source to said first and second fluid-applying means for selectively terminating and restoring flow of fluid to both turbines on command.

2. Apparatus according to claim 1 wherein said first and second valves are manually adjustable to vary the rate of flow of fluid to said first and second turbines respectively.

3. Apparatus according to claim 1 further including:
   - tape monitoring means adapted to produce an electrical signal when a predetermined amount of tape has been wound on a spool mounted on said second shaft;
   - and means responsive to said signal for causing said control means to terminate flow of fluid to both said turbines.

4. Apparatus according to claim 2 wherein said first and second valves are adjustable independently to admit fluid to said turbines at respective rates such as to maintain tension on said tape.

5. Apparatus according to claim 1 wherein said control means also comprises electrically controllable valve means for terminating flow of said fluid to said turbines.

6. Apparatus according to claim 1 further including means for measuring the amount of tape being transported from first spool to said second spool.

7. Apparatus according to claim 6 wherein said tape measuring means comprises a wheel that is engaged and rotated by tape being transported from said first spool to said second spool, means for counting the revolutions of said wheel, and means for producing an output signal when said wheel has rotated a predetermined number of times.

8. Apparatus according to claim 7 wherein said control means is responsive to said output signal for terminating flow of fluid to both said turbines.

9. Apparatus according to claim 1 further including means for detecting the presence of a predetermined signal recorded on said tape, and further wherein said control means terminates flow of fluid to both said turbines when said signal is detected.

10. Apparatus according to claim 9 further including third means for applying fluid under pressure to said first turbine to drive the rotor thereof in the opposite direction, and means for causing said third fluid-applying means to apply fluid to said first turbine immediately after it has stopped in response to detection of said recorded signal.

11. Method of unwinding tape from one spool and winding it on another spool while maintaining the moving tape under controlled tension comprising:
    - mounting a first spool with a supply of tape thereon on a first shaft that is coupled to a first relatively large inertia fluid driven turbine;
    - connecting one end of said tape to a second spool on a second shaft that is coupled to a second relatively low inertia fluid driven turbine;
    - supplying a fluid under pressure to said first turbine so as to rotate said first shaft in a direction whereby tape is unwound from said first spool;
    - simultaneously supplying fluid under pressure to said second turbine so as to rotate said second shaft in a direction to wind said tape on said second spool; and
    - independently controlling the flow of fluid to said first turbine and the flow of fluid to said second turbine so as to urge said second turbine to wind tape on said second spool at a faster rate than it is unwound from said first spool by said first turbine, whereby to maintain tension on said tape as it moves from said first spool to said second spool.

12. Method according to claim 11 wherein the volume of fluid supplied to said first turbine per unit time is greater than the volume of fluid supplied to said second turbine per unit time.

13. Method according to claim 11 wherein the fluid supplied to said first turbine is at the same pressure as the fluid supplied to said second turbine.

14. Apparatus according to claim 1 wherein said fluid is air.

15. Method according to claim 11 wherein said fluid is air.

* * * * *